UNITED STATES PATENT OFFICE.

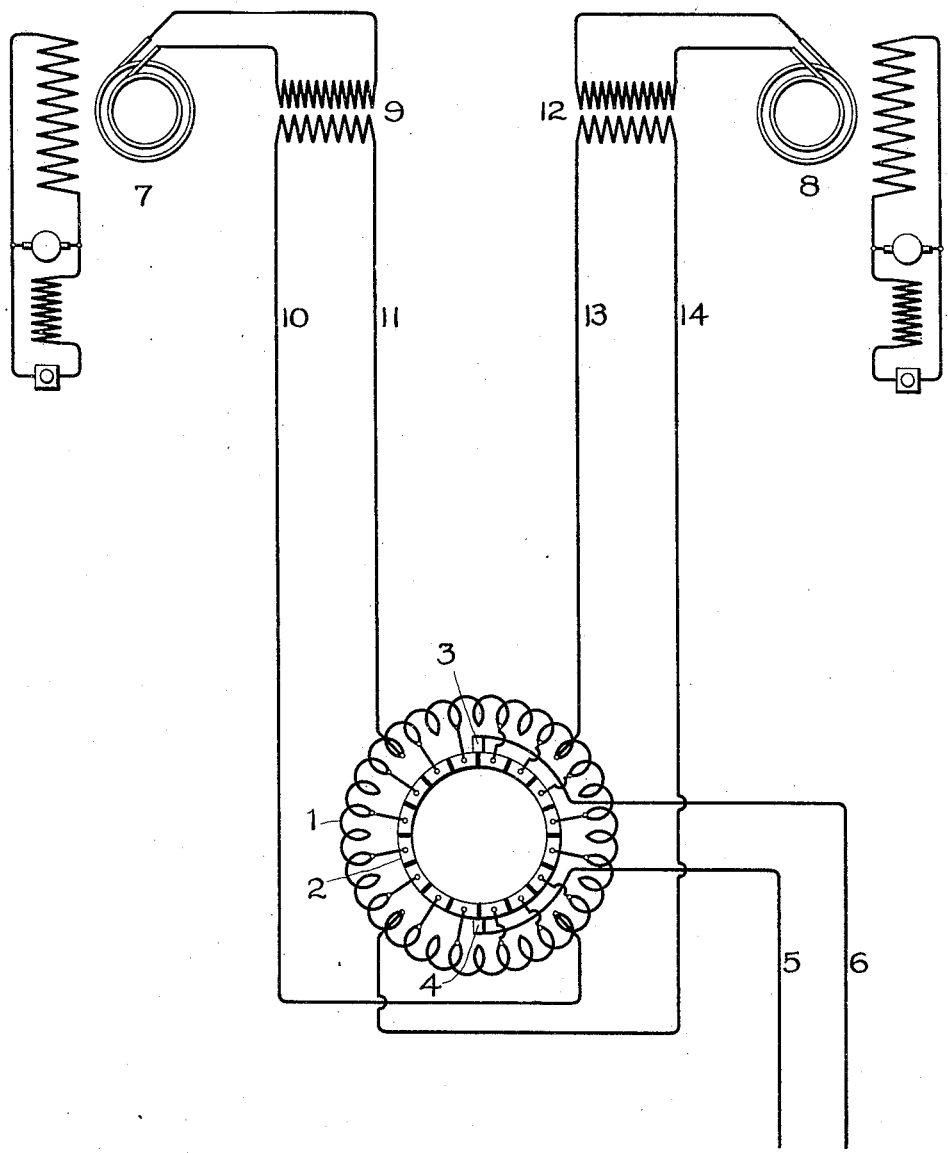

ALEXANDER D. LUNT, OF SCHENECTADY, NEW YORK, ASSIGNOR TO THE GENERAL ELECTRIC COMPANY, OF NEW YORK.

SYSTEM OF ELECTRICAL DISTRIBUTION.

SPECIFICATION forming part of Letters Patent No. 656,650, dated August 28, 1900.

Application filed June 30, 1900. Serial No. 22,116. (No model.)

*To all whom it may concern:*

Be it known that I, ALEXANDER D. LUNT, a citizen of the United States, residing at Schenectady, county of Schenectady, State of New York, have invented certain new and useful Improvements in Systems of Electrical Distribution, (Case No. 1,460,) of which the following is a specification.

My present invention relates to a distributing system for alternating currents which, among other features, comprises a means for holding a plurality of alternating-current dynamo-electric machines of a given number of phases in displaced-phase relation to each other by operative connections to another dynamo-electric machine of a different number of phases. In a more limited sense my invention renders it possible to secure the beneficial effects of a multiphase current from single-phase sources by making use of a multiphase receiving apparatus to which are connected a plurality of single-phase dynamo-electric machines held in displaced-phase relation to each other through the reaction of their electromotive forces with those generated by said multiphase machines. These, as well as the other features of my invention, will be better understood by reference to the accompanying drawings, taken in connection with the following description, while the scope of the invention, both as to its broad and more limited features of novelty, will be apparent by reference to claims appended hereto.

The drawing represents a quarter-phase rotary converter fed from single-phase sources of alternating current. The armature of the rotary converter is indicated at 1 and is provided with a commutator 2, upon which bear brushes 3 4, from which lead the direct-current mains 5 6. Any suitable translating devices may be supplied from the direct-current system.

Current is supplied to the rotary converter from two single-phase alternating-current generators 7 8. These generators are not mechanically connected to each other, as would be the case, for example, if they were driven upon the same shaft, but are free to adjust their phase relations with each other. The generator 7 is connected inductively, through a transformer 9, to leads 10 11, connected to points in the armature 1 of the rotary converter separated from each other in this instance by one-half the polar pitch, or, in other words, one hundred and eighty degrees apart. The generator 8 is similarly connected, through a transformer 12, to leads 13 14, also connected to points in the winding separated from each other to the same extent as the points of connection of the leads 10 11. The points of connection of the leads 13 14 are, however, so arranged as to lie half-way between the points of connection of the leads 10 11, thereby constituting a quarter-phase connection which corresponds to a four-phase relation of electromotive forces in the converter-armature. The diagram represents a bipolar converter, but in practice a multiphase construction is preferable, in which case the number of connections to the armature will be made to correspond, as will be evident to one skilled in the art.

In starting up the apparatus the rotary converter should first be thrown in circuit with one of the single-phase sources and after this connection has been effected then with the other. By so doing no difficulty will be found in putting the machines into coöperation with each other.

The embodiment of my invention which I have above described comprising single-phase sources of current coöperating through the instrumentality of a multiphase receiving-circuit, although a valuable application of the principles of my invention is but one of various forms that the invention may assume. Thus, for example, instead of the single-phase source of current I may employ sources having any given number of phases connected through the instrumentality of a receiving-circuit of a different number of phases. As another example I may employ three-phase generators to feed a six-phase rotary converter, the generators, as in the specific case described to illustrate my invention, being free to adjust their phase relations to each other as may be required by reason of their connection to the six-phase machine. From what has been said it will be evident that my invention is capable of numerous modifications and embodiments without departing from the spirit thereof, for which reason I do not wish to be limited to the specific arrangement shown.

What I claim as new, and desire to secure by Letters Patent of the United States, is—

1. The combination with a plurality of alternating-current dynamo-electric machines free to adjust their phase relations to each other, of a synchronous receiving-machine having a number of phases different from that of any of the first-mentioned machines.

2. The combination of a plurality of alternating-current generators of a given number of phases held in displaced-phase relation to each other by operative connections to a rotary converter of a different number of phases.

3. The combination of a plurality of alternating-current generators of a given number of phases, held in displaced-phase relation to each other by operative connections to a synchronous receiving apparatus of a greater number of phases.

4. The combination of a plurality of single-phase alternating-current generators held in displaced-phase relation to each other by operative connections to a synchronous receiving apparatus.

5. The combination of a plurality of single-phase alternating-current generators held in displaced-phase relation to each other by operative connections to a synchronous receiving apparatus of a greater number of phases.

6. The combination of a plurality of single-phase alternating-current generators held in displaced-phase relation to each other by operative connections to a quarter-phase synchronous receiving apparatus.

7. The combination of a plurality of single-phase alternating-current generators held in displaced-phase relation to each other by operative connections to a quarter-phase rotary converter.

8. The combination of a direct-current system of distribution, a multiphase rotary converter connected thereto, and single-phase dynamo-electric machines connected to said rotary converter.

9. The combination of a direct-current distribution system, a rotary converter of a given number of phases connected to said distribution system, and dynamo-electric machines of a different number of phases connected to said rotary converter.

In witness whereof I have hereunto set my hand this 28th day of June, 1900.

ALEXANDER D. LUNT.

Witnesses:
  BENJAMIN B. HULL,
  MABEL E. JACOBSON.